US012767341B2

(12) United States Patent
Riverin

(10) Patent No.: US 12,767,341 B2
(45) Date of Patent: Oct. 20, 2026

(54) MITIGATION OF ASYMMETRIC THRUST FOR AIRCRAFT

(71) Applicant: Pratt & Whitney Canada Corp., Longueuil (CA)

(72) Inventor: Guy Riverin, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 196 days.

(21) Appl. No.: 18/654,240

(22) Filed: May 3, 2024

(65) Prior Publication Data

US 2025/0340302 A1 Nov. 6, 2025

(51) Int. Cl.
*B64D 31/00* (2024.01)
*B64D 31/10* (2006.01)

(52) U.S. Cl.
CPC .................................... *B64D 31/10* (2013.01)

(58) Field of Classification Search
CPC ................................ B64D 31/10; B64D 31/00
USPC .............................................................. 701/3
See application file for complete search history.

(56) References Cited

U.S. PATENT DOCUMENTS 8,352,099 B1 * 1/2013 Eggold .................. B64D 31/06 701/4
10,746,104 B2 * 8/2020 Stockwell ................. F02C 9/42
2017/0058786 A1 * 3/2017 Stockwell ............... F02C 7/042
2018/0072430 A1 3/2018 Misfeldt
2020/0217253 A1 * 7/2020 King ....................... F02D 25/00

OTHER PUBLICATIONS

European Search Report dated Sep. 8, 2025, in connection with European Patent Application No. 25174078.3, 10 pages.

* cited by examiner

*Primary Examiner* — Shardul D Patel

(57) ABSTRACT

A method includes detecting an asymmetric thrust condition involving first and second engines of an aircraft. The asymmetric thrust condition is associated with one of the engines providing more thrust than another of the engines. The method also includes, in response to detecting the asymmetric thrust condition, determining a modifier for one of the engines and applying the modifier to an acceleration schedule for that engine. The modifier alters the acceleration schedule for that engine to reduce asymmetric thrust between the engines. In some cases, the first engine is associated with a first thrust controller, the second engine is associated with a second thrust controller, the first thrust controller is configured to modify an acceleration schedule of the first engine in response to the asymmetric thrust condition, and the second thrust controller is configured to modify an acceleration schedule of the second engine in response to the asymmetric thrust condition.

19 Claims, 4 Drawing Sheets

MITIGATION OF ASYMMETRIC THRUST FOR AIRCRAFT

TECHNICAL FIELD

This disclosure is generally directed to aircraft control systems. More specifically, this disclosure is directed to the mitigation of asymmetric thrust for aircraft.

BACKGROUND

Aircraft routinely include multiple engines on opposite sides of the aircraft, such as one or more engines on a left wing of an aircraft and one or more engines on a right wing of the aircraft. All engines of an aircraft are typically idling or running at a low taxiing speed while the aircraft is on the ground prior to start of takeoff, and the engines then "spool up" in order to generate thrust during takeoff.

SUMMARY

This disclosure is directed to the mitigation of asymmetric thrust for aircraft.

In a first embodiment, a method includes detecting an asymmetric thrust condition involving first and second engines of an aircraft, where the asymmetric thrust condition is associated with one of the engines providing more thrust than another of the engines. The method also includes, in response to detecting the asymmetric thrust condition, determining a modifier for one of the engines and applying the modifier to an acceleration schedule for that engine, where the modifier alters the acceleration schedule for that engine to reduce asymmetric thrust between the engines.

In a second embodiment, an apparatus includes at least one thrust controller configured to control at least one of first and second engines of an aircraft. Each thrust controller is configured to detect an asymmetric thrust condition involving the first and second engines, where the asymmetric thrust condition is associated with one of the engines providing more thrust than another of the engines. Each thrust controller is also configured, in response to detecting the asymmetric thrust condition, to determine a modifier for one of the engines and apply the modifier to an acceleration schedule for that engine such that the modifier alters the acceleration schedule for that engine to reduce asymmetric thrust between the engines.

In a third embodiment, a non-transitory machine readable medium contains instructions that when executed cause a thrust controller to detect an asymmetric thrust condition involving first and second engines of an aircraft, where the asymmetric thrust condition is associated with one of the engines providing more thrust than another of the engines. The non-transitory machine readable medium also contains instructions that when executed cause the thrust controller, in response to detecting the asymmetric thrust condition, to determine a modifier for one of the engines and apply the modifier to an acceleration schedule for that engine such that the modifier alters the acceleration schedule for that engine to reduce asymmetric thrust between the engines.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
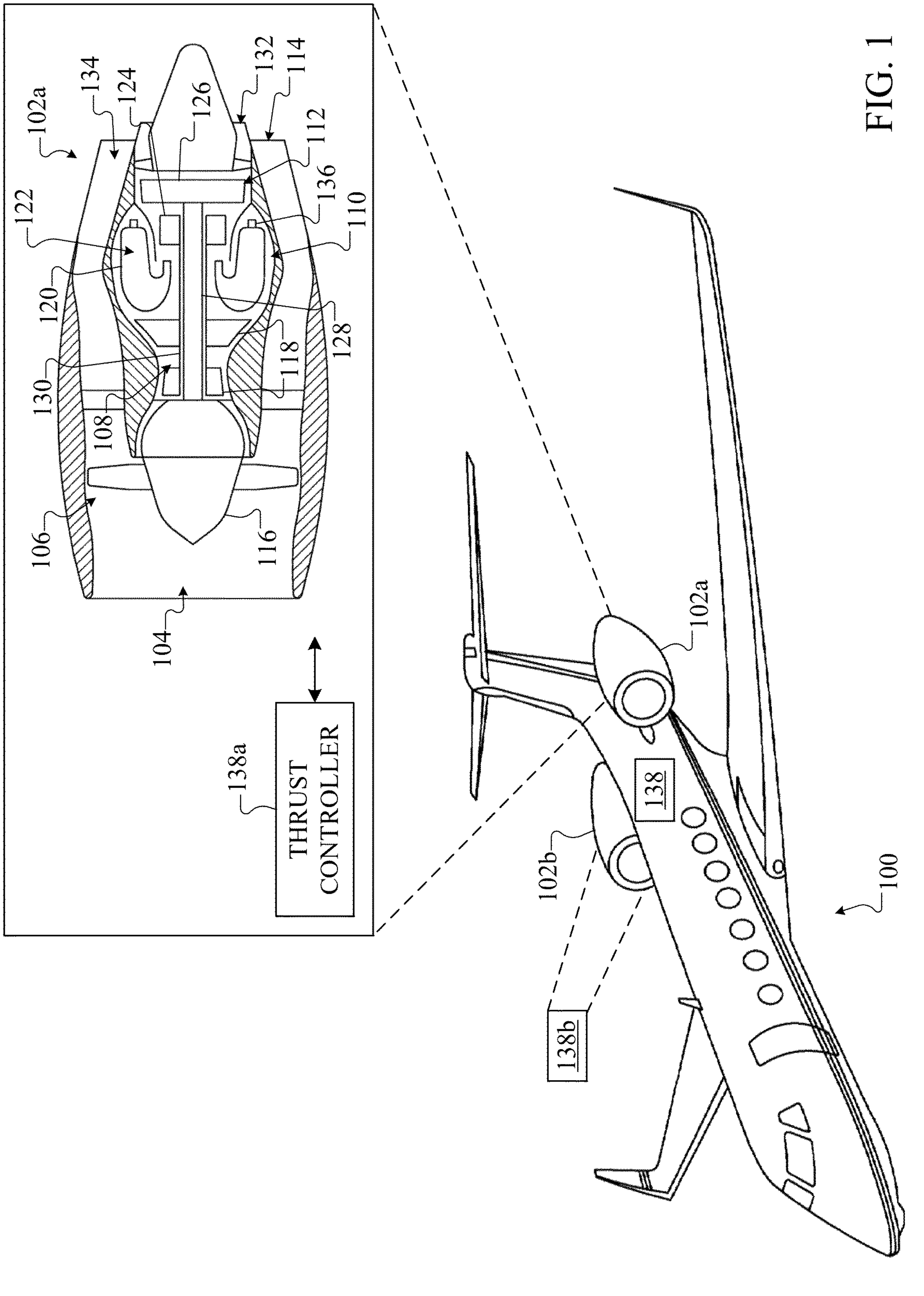
FIG. 1 illustrates an example aircraft supporting mitigation of asymmetric thrust according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, aircraft routinely include multiple engines on opposite sides of the aircraft, such as one or more engines on a left wing of an aircraft and one or more engines on a right wing of the aircraft. All engines of an aircraft are typically idling or running at a low taxiing speed while the aircraft is on the ground prior to start of takeoff, and the engines then "spool up" in order to generate thrust during takeoff.

One issue that can arise during engine spool up and takeoff is asymmetric thrust, which occurs when an engine on one side of an aircraft produces more thrust than an engine on the other side of the aircraft. For example, when a pilot initiates takeoff on a runway as an aircraft is idling or moving at a low taxiing speed, the pilot can advance engine throttle levers for the engines from an idle gate to a maximum takeoff (MTO) position. If different engines spool up from ground idle to takeoff power at different rates, asymmetric thrust can occur, and larger differences in the spool up rates can cause larger amounts of asymmetric thrust. Significant amounts of asymmetric thrust occurring at low ground speeds can degrade or cause a significant loss of directional control over the aircraft or other complications during takeoff, possibly resulting in the aircraft veering off the runway or requiring takeoff to be aborted.

This disclosure describes techniques for mitigation of asymmetric thrust for aircraft. As described in more detail below, at least one controller can be associated with one or more engines on one side of an aircraft, and at least one controller can be associated with one or more engines on another side of the aircraft. Each controller can monitor its associated engine's speed and reference speed, as well as another engine's speed and reference speed (such as for an engine on the opposite side of the aircraft). Mismatches can be detected that might indicate asymmetric thrust is occurring, and one or more of the controllers can increase or decrease the thrust provided by one or more associated engines to help reduce or eliminate the asymmetric thrust condition. This can significantly reduce the amount of asymmetric thrust experienced during takeoff and reduce or eliminate problems associated with asymmetric thrust. Moreover, each controller can be configured to modify its associated engine's transient thrust only when a specific set of conditions is satisfied, such as one or more conditions indicating that the aircraft engines are spooling up for takeoff. When the conditions are not satisfied, the controllers may not attempt to modify their associated engines' thrusts based on any detected asymmetric thrust, which can help to ensure that asymmetric thrust mitigation only occurs during specific operations like "spool up" to takeoff from ground idle and not at other undesired times.

FIG. 1 illustrates an example aircraft 100 supporting mitigation of asymmetric thrust according to this disclosure. As shown in FIG. 1, the aircraft 100 represents an airplane having multiple engines 102*a*-102*b*, where at least one engine 102*a* is positioned on one side of the aircraft 100 and at least one engine 102*b* is positioned on the opposite side of the aircraft 100. Note that the form of the aircraft 100 shown in FIG. 1 is for illustration only and that the aircraft 100 may have any other suitable form. As one example, the engines 102*a*-102*b* of the aircraft 100 may be positioned on the wings of the aircraft 100 rather than towards the rear of the aircraft 100. As another example, while the aircraft 100 in this example has two engines 102*a*-102*b*, the aircraft 100 may have other numbers of engines, such as when two or more engines are positioned on each side of the aircraft 100. As noted above, the aircraft 100 can suffer from asymmetric thrust if one of the engines 102*a*-102*b* provides significantly more thrust during spool up to takeoff than another of the engines 102*a*-102*b*.

As shown in FIG. 1, each engine 102*a*-102*b* includes various components used to create thrust for moving the aircraft 100. In this example, each engine 102*a*-102*b* can include an inlet 104, a fan section 106, a compressor section 108, a combustion section 110, a turbine section 112, and an exhaust 114. The inlet 104 generally includes an opening that allows air to be drawn into the engine 102*a*-102*b*. The fan section 106 includes a fan rotor 116, and the compressor section 108 includes a compressor rotor 118. The combustion section 110 includes an annular combustor 120 having a combustion chamber 122. The turbine section 112 includes a high pressure turbine (HPT) rotor 124 and a low pressure turbine (LPT) rotor 126. Each rotor 116, 124, 126 typically includes rotor blades arranged circumferentially around and connected to one or more respective rotor disks. The fan rotor 116 is connected to the LPT rotor 126 through a low-speed shaft 128, and the compressor rotor 118 is connected to the HPT rotor 124 through a high-speed shaft 130. The low-speed shaft 128 can extend through a bore of the high-speed shaft 130 between the fan rotor 116 and the LPT rotor 126.

During operation, air enters each engine 102*a*-102*b* through the inlet 104, and the air is directed through the fan section 106 into a core flow path 132 and a bypass flow path 134. The core flow path 132 extends sequentially through the sections 108-112 of the engine 102*a*-102*b*, which are often referred to as an "engine core." The air within the core flow path 132 may often be referred to as "core air." The bypass flow path 134 extends through a bypass duct, which bypasses the engine core. The air within the bypass flow path 134 may often be referred to as "bypass air." The core air is compressed by the compressor rotor 118 and directed into the combustion chamber 122 of the combustor 120. Fuel is injected into the combustion chamber 122 via one or more fuel injectors 136 and mixed with the compressed core air to provide a fuel-air mixture. The fuel-air mixture is ignited, and the resulting combustion products flow through and sequentially cause the HPT rotor 124 and the LPT rotor 126 to rotate. Rotation of the HPT rotor 124 drives rotation of the compressor rotor 118 and thereby causes compression of air received from the inlet 104 into the core flow path 132. Rotation of the LPT rotor 126 drives rotation of the fan rotor 116, which propels bypass air through and out of the bypass flow path 134. The propulsion of the bypass air can account for a significant portion (such as a majority) of the thrust generated by the engine 102*a*-102*b*.

Note that this represents a brief description of one example type of engine 102*a*-102*b* that may be used on an aircraft 100. Additional details of this type of engine 102*a*-102*b* are known to people skilled in the relevant art and are omitted here for brevity. Also note that the example engine 102*a*-102*b* shown here represents a turbofan engine, which is one type of engine 102*a*-102*b* that may be used on the aircraft 100. However, any other suitable type of engine now known or later developed may be used with the aircraft 100. As particular examples, the engines 102*a*-102*b* of the aircraft 100 may represent turbofan engines, turbojet engines, turboprop engines, or turboshaft engines.

Two values often used to control engines 102*a*-102*b* of an aircraft 100 are N1 and N2 speeds of each engine 102*a*-102*b*. The N1 speed of an engine 102*a*-102*b* refers to the rotational speed of the low-speed shaft 128 expressed as a percentage of maximum normal operating rotations per minute (RPMs) of the low-speed shaft 128. The N2 speed of an engine 102*a*-102*b* refers to the rotational speed of the high-speed shaft 130 expressed as a percentage of maximum normal operating RPMs of the high-speed shaft 130. In other words, the N1 speed of an engine 102*a*-102*b* identifies its fan speed, and the N2 speed of the engine 102*a*-102*b* identifies its core speed.

Each of the engines 102*a*-102*b* may often use its N1 speed for regulation purposes. For example, prior to takeoff, the engines 102*a*-102*b* may often be controlled to have equal or substantially equal idle N1 speeds. However, adjustments to an engine's idle N1 speed can alter the engine's N2 speed, as well. When multiple engines 102*a*-102*b* are being adjusted, this can result in the engines 102*a*-102*b* having different N2 speeds and therefore producing different amounts of thrust during spool up. If the asymmetric thrust becomes too large, this can create various problems as described above. While it might be possible to simply rate-limit the N1 speeds of the engines 102*a*-102*b* to help limit the asymmetric thrust, this results in a slower acceleration schedule, which can be undesirable.

As described in more detail below, each engine 102*a*-102*b* can be respectively associated with a thrust controller 138*a*-138*b*. The thrust controller 138*a* can monitor its own engine 102*a* as well as the other engine 102*b* in order to detect potential asymmetric thrust, and the thrust controller 138*a* can adjust operation of its engine 102*a* to help compensate for the asymmetric thrust during spool up to takeoff power. Similarly, the thrust controller 138*b* can monitor its own engine 102*b* as well as the other engine 102*a* in order to detect potential asymmetric thrust, and the thrust controller 138*b* can adjust operation of its engine 102*b* to help compensate for the asymmetric thrust. Each thrust controller 138*a*-138*b* is said to be associated with a "local" engine, which represents the engine 102*a*-102*b* that is controlled by that thrust controller 138*a*-138*b*. Each thrust controller 138*a*-138*b* is also said to be associated with a "remote" engine, which represents another engine 102*b*-102*a* that is not controlled by that thrust controller 138*a*-138*b*. Thus, the thrust controller 138*a* monitors a local engine 102*a* and a remote engine 102*b*, and the thrust controller 138*b* monitors a local engine 102*b* and a remote engine 102*a*. By modifying the engines 102*a*-102*b* based on detected asymmetric thrust during spool up from ground idle to high thrust, the thrust controllers 138*a*-138*b* can reduce or eliminate the problems associated with asymmetric thrust.

As described below, each thrust controller 138*a*-138*b* can be configured to perform these functions for mitigating asymmetric thrust only when a specified set of conditions is satisfied. The set of conditions can indicate that the aircraft 100 is currently operating under one or more conditions in which asymmetric thrust may be problematic. For instance, the set of conditions may be used to identify whether the aircraft 100 is currently spooling up for takeoff starting from an idling condition or from a low taxiing speed condition. Asymmetric thrust can be more problematic during low ground speeds, while asymmetric thrust may be less problematic after the aircraft 100 has taken off. Thus, the set of conditions can be used to control whether each thrust controller 138_a_-138_b_ modifies the thrust of its associated engine 102_a_-102_b_. This allows the thrust adjustments described below to only be applied selectively.

Each thrust controller 138_a_-138_b_ includes any suitable hardware or any suitable combination of hardware and software/firmware configured to perform asymmetric thrust mitigation. For example, each thrust controller 138_a_-138_b_ may be implemented using one or more processing devices, such as one or more microprocessors, microcontrollers, digital signal processors (DSPs), application specific integrated circuits (ASICs), field programmable gate arrays (FPGAs), or discrete circuitry. Note that while separate thrust controllers 138_a_-138_b_ are shown in FIG. 1, it is possible to have a centralized thrust controller 138 (either in an engine 102_a_ or 102_b_ or other location on an aircraft 100) that can perform thrust control operations for multiple engines 102_a_-102_b_. As a particular example, each thrust controller 138, 138_a_, 138_b_ may form part of or be included in an electronic engine controls (EEC) system or a flight management system (FMS) of the aircraft 100.

Although FIG. 1 illustrates one example of an aircraft 100 supporting mitigation of asymmetric thrust, various changes may be made to FIG. 1. For example, as noted above, the form of the aircraft 100 and the positions of the engines 102_a_-102_b_ on the aircraft 100 can vary depending on the implementation. Also, the aircraft 100 may include more than two engines, such as two or more engines on one side of the aircraft 100 and two or more engines on the opposite side of the aircraft 100. In those cases, the techniques described in this disclosure may be applied to pairs of engines, where each pair includes an engine in one position on one side of the aircraft 100 and an engine in the same position on the opposite side of the aircraft 100. Thus, for instance, a pair of innermost engines (one on each side of the aircraft 100) may be controlled to avoid asymmetric thrust, and a pair of outermost engines (one on each side of the aircraft 100) may be controlled to avoid asymmetric thrust.

Figure 2:
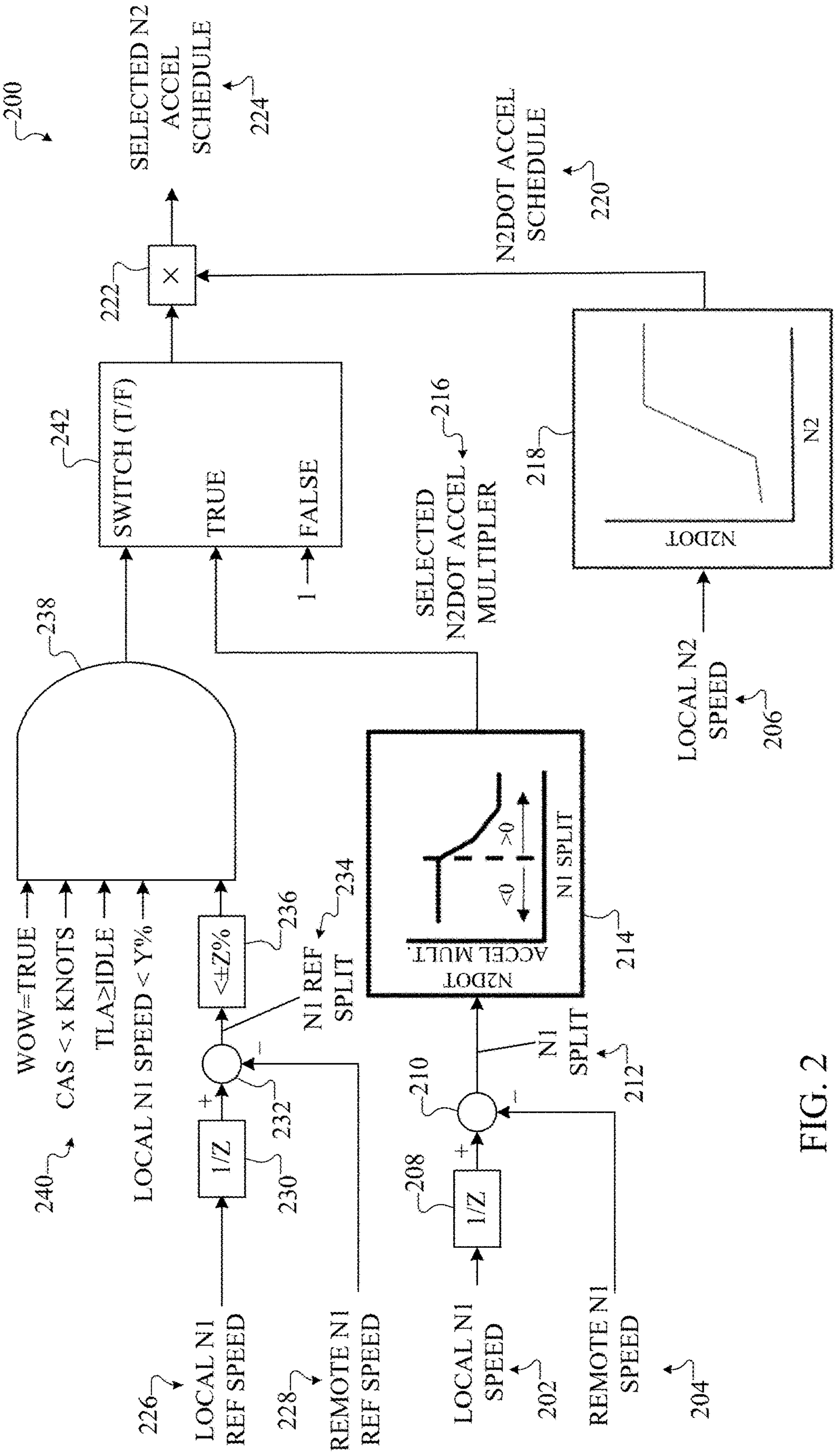
FIG. 2 illustrates an example logical architecture supporting mitigation of asymmetric thrust according to this disclosure.

FIG. 2 illustrates an example logical architecture 200 supporting mitigation of asymmetric thrust according to this disclosure. More specifically, the logical architecture 200 may represent the logic executed or otherwise used by each thrust controller 138, 138_a_-138_b_ of an aircraft 100 in order to reduce or avoid problems associated with asymmetric thrust created by the engines 102_a_-102_b_. Note, however, that the logical architecture 200 may be used with any other suitable aircraft and/or any other suitable engines.

In the following discussion, it is assumed that the logical architecture 200 is being used in the thrust controller 138_a_ associated with the engine 102_a_. The logical architecture 200 can also be implemented in the thrust controller 138_b_ associated with the engine 102_b_. The only difference would be in the definitions of local and remote engines. From the perspective of the thrust controller 138_a_, the engine 102_a_ is the local engine, and the engine 102_b_ is the remote engine. From the perspective of the thrust controller 138_b_, the engine 102_b_ is the local engine, and the engine 102_a_ is the remote engine.

As shown in FIG. 2, the logical architecture 200 receives and processes various inputs, including a local engine N1 speed 202, a remote engine N1 speed 204, and a local engine N2 speed 206. The local engine N1 speed 202 can represent the N1 speed of the local engine 102_a_, and the remote engine N1 speed 204 can represent the N1 speed of the remote engine 102_b_. The local engine N2 speed 206 can represent the N2 speed of the engine 102_a_. Note that each of these inputs 202-206 can be obtained from any suitable source, such as a sensor or other device that can determine an N1 or N2 speed.

As shown here, the local engine N1 speed 202 is provided to a delay function 208, which delays the local engine N1 speed 202 by a specified amount of time. The specified amount of time here can be based on the fact that there may be some delay in obtaining the remote engine N1 speed 204, such as when the thrust controller 138_a_ is positioned in or near the engine 102_a_ and receives the local engine N1 speed 202 from the engine 102_a_ faster than the remote engine N1 speed 204 is received from the engine 102_b_. The delay function 208 can therefore delay the local engine N1 speed 202 so that the delayed local engine N1 speed 202 and the remote engine N1 speed 204 are aligned in time. The delayed local engine N1 speed 202 and the remote engine N1 speed 204 are provided to a combiner 210, which combines the delayed local engine N1 speed 202 and the remote engine N1 speed 204. In this example, the combiner 210 subtracts the remote engine N1 speed 204 from the delayed local engine N1 speed 202, which generates an N1 split value 212.

The N1 split value 212 represents the difference between the N1 speeds 202-204 of the engines 102_a_-102_b_. The N1 split value 212 can be zero when there is no difference between the N1 speeds 202-204, positive when the local engine N1 speed 202 exceeds the remote engine N1 speed 204, and negative when the remote engine N1 speed 204 exceeds the local engine N1 speed 202. As a result, the N1 split value 212 can be used to identify both the presence and the magnitude of an N1 split condition, which refers to the engines 102_a_-102_b_ having different N1 speeds.

The N1 split value 212 is provided to a mapping function 214, which converts the N1 split value 212 into a selected "N2Dot" acceleration multiplier value 216. N2Dot refers to the rate of change of the associated engine's N2 speed. The local engine N2 speed 206 is provided to another mapping function 218, which converts the local engine N2 speed 206 into an N2Dot acceleration schedule 220. The N2Dot acceleration schedule 220 identifies a desired change in the N2 speed for the associated engine 102_a_. A multiplier function 222 multiplies the N2Dot acceleration schedule 220 by the selected N2Dot acceleration multiplier value 216, which results in the generation of a selected N2 acceleration schedule 224. The N2 acceleration schedule 224 identifies a desired N2 speed for the associated engine 102_a_ and can be applied to the engine 102_a_ in order to adjust the rate of increasing thrust generated by the engine 102_a_.

The mapping function 214 here varies the N2Dot acceleration multiplier value 216 based on an amount of N1 split detected by the logical architecture 200. In this particular example, when the N1 split value 212 is negative, the N2Dot acceleration multiplier value 216 can remain generally constant at a high value (such as a value of one). In this case, the local engine 102_a_ is said to be the "lagging" engine since the local engine 102_a_ has a smaller N1 speed than the remote engine 102*b*. As a result, the selected N2 acceleration schedule 224 can be based almost or completely on the N2Dot acceleration schedule 220, and the N2Dot acceleration multiplier value 216 may provide little or no change to the N2Dot acceleration schedule 220. The remote engine 102*b* is said to be the "leading" engine since the remote engine 102*b* has a larger N1 speed than the local engine 102*a*. Here, it is assumed that the thrust controller 138*b* for the remote engine 102*b* will reduce the rate of N1 speed increase of the remote engine 102*b* in order to help reduce or eliminate the N1 speed split between the engines 102*a*-102*b*.

Moreover, in this particular example, when the N1 split value 212 is positive, the N2Dot acceleration multiplier value 216 can generally decrease as a function of the N1 split value 212. In this case, the local engine 102*a* is said to be the "leading" engine since the local engine 102*a* has a larger N1 speed than the remote engine 102*b*. As a result, the N2Dot acceleration multiplier value 216 gets smaller and smaller as the N1 split value 212 becomes larger and larger (at least until some minimum value is reached in this example). The smaller N2Dot acceleration multiplier value 216 is multiplied by the N2Dot acceleration schedule 220 in order to generate the selected N2 acceleration schedule 224, resulting in a smaller selected N2 acceleration schedule 224 for the engine 102*a*. This causes the local engine 102*a* to reduce the increase in its acceleration and provide a smaller rate of increase in its thrust than would ordinarily occur based solely on the local engine N2 speed 206. The remote engine 102*b* is said to be the "lagging" engine since the remote engine 102*b* has a lower N1 speed than the local engine 102*a*. As a result, the remote engine 102*b* can continue its normal rate of increase in thrust since (from the perspective of the thrust controller 138*b* for the remote engine 102*b*) the engine 102*b* needs to increase its thrust relative to the engine 102*a*.

The values used by the mapping function 214 here can be established in any suitable manner. For example, the relatively high constant value used by the mapping function 214 when the N1 split value 212 is negative can be set to a specified value (such as one) in order to prevent modifications from occurring to the N2Dot acceleration schedule 220. However, the mapping function 214 may alternatively apply a larger value (such as somewhat larger than one) in order to increase the N2Dot acceleration schedule 220 when the local engine 102*a* is the lagging engine. While this may necessitate the use of additional logic to prevent the local engine 102*a* from exceed safety guidelines or other acceleration restrictions, such an approach is within the scope of this disclosure. Also, the smaller values used by the mapping function 214 when the N1 split value 212 is positive can be set based on how aggressive changes to the N2Dot acceleration schedule 220 should be when the local engine 102*a* is the leading engine. The values used by the mapping function 218 can represent the ordinary mapping used by the aircraft 100 during normal operation.

While this approach for mitigating asymmetric thrust allows the acceleration schedules of the engines 102*a*-102*b* to be adjusted so that the engines 102*a*-102*b* provide relatively equal amounts of thrust, asymmetric thrust mitigation may typically be needed or desired only under specific circumstances. For example, asymmetric thrust mitigation may only be needed during engine spool up for takeoff from an idle or low speed condition. At other times, it may be desirable to prevent modifications to the N2Dot acceleration schedule 220 based on N2Dot acceleration multiplier values 216. In order to selectively enable the asymmetric thrust mitigation, the logical architecture 200 can operate as follows.

The logical architecture 200 can also receive a local engine N1 reference speed 226 and a remote engine N1 reference speed 228. The local engine N1 reference speed 226 represents the desired N1 speed of the local engine 102*a*, and the remote engine N1 reference speed 228 represents the desired N1 speed of the remote engine 102*b*. The local engine N1 reference speed 226 is provided to a delay function 230, which delays the local engine N1 reference speed 226 by a specified amount of time. Again, the specified amount of time here can be based on the fact that there may be some transmission delay in obtaining the remote engine N1 reference speed 228, such as when the thrust controller 138*a* is positioned in or near the engine 102*a* and receives the local engine N1 reference speed 226 from the engine 102*a* faster than the remote engine N1 reference speed 228 is received from the engine 102*b*. The delayed local engine N1 reference speed 226 and the remote engine N1 reference speed 228 are provided to a combiner 232, which combines the delayed local engine N1 reference speed 226 and the remote engine N1 reference speed 228. In this example, the combiner 232 subtracts the remote engine N1 reference speed 228 from the delayed local engine N1 reference speed 226, which generates an N1 reference split value 234.

The N1 reference split value 234 represents the difference between the N1 reference speeds 226-228 of the engines 102*a*-102*b*. In other words, the N1 reference split value 234 can indicate whether the pilot of the aircraft 100 wants the engines 102*a*-102*b* to have substantially equal N1 speeds. This is common during spool up for takeoff, such as when the pilot of the aircraft 100 advances the engine throttle levers for the engines 102*a*-102*b* from an idle gate to a maximum takeoff position. A determination function 236 can determine whether the N1 reference split value 234 is substantially small, such as when the difference between the N1 reference speeds 226-228 of the engines 102*a*-102*b* is within a threshold amount or percentage. If so, this satisfies one condition for invoking the asymmetric thrust mitigation of the logical architecture 200 since it indicates a desire for substantially equal N1 speeds to be obtained.

The logical architecture 200 here also includes an AND function 238, which determines whether all conditions within a set of conditions 240 are satisfied. Here, one of the conditions 240 is whether the determination function 236 determines that the N1 reference split value 234 is substantially small, which indicates that the pilot desires for the engines 102*a*-102*b* to have substantially similar N1 speeds. In this example, there are four other conditions. One condition is expressed as "WOW=TRUE," which indicates that the aircraft 100 senses weight on wheels (WOW). In other words, this condition is satisfied when the weight of the aircraft 100 is at least partially resting on the wheels of the aircraft 100. Another condition is expressed as "CAS<x KNOTS," which indicates that the calibrated airspeed (CAS) of the aircraft 100 is below some threshold speed expressed as x knots. This condition helps to avoid applying asymmetric thrust mitigation when the aircraft 100 is traveling at an adequately high rate of speed. Yet another condition is expressed as "TLA≥IDLE," which indicates that a thrust lever angle (TLA) of the engine throttle lever for the local engine 102*a* is at or above an idle position. This condition helps to avoid applying asymmetric thrust mitigation when the aircraft 100 is not actively spooling up. Still another condition is expressed as "LOCAL N1 SPEED<Y %,” which indicates that the N1 speed of the local engine 102*a* is below a specified value or percentage. This condition helps to avoid applying asymmetric thrust mitigation when the local engine 102*a* has obtained an adequate N1 speed.

The AND function 238 can determine if all of these various conditions 240 are satisfied, and the AND function 238 can provide an output to a switch 242. The switch 242 can selectively output either a value received at its “true” input or a value received at its “false” input depending on the output of the AND function 238. When the AND function 238 determines that at least one of the conditions 240 is not satisfied, the AND function 238 can cause the switch 242 to select the value received at its “false” input, which in this case represents a value of one. In this state, the multiplier function 222 multiplies the N2Dot acceleration schedule 220 by one, which does not modify the N2Dot acceleration schedule 220. As a result, asymmetric thrust mitigation is not performed. When the AND function 238 determines that all conditions 240 are satisfied, the AND function 238 can cause the switch 242 to select the value received at its “true” input. In that state, the multiplier function 222 multiplies the N2Dot acceleration schedule 220 by the N2Dot acceleration multiplier value 216, which can modify the N2Dot acceleration schedule 220. As a result, asymmetric thrust mitigation is performed.

In this way, the logical architecture 200 is able to selectively apply asymmetric thrust mitigation, such as only when the aircraft 100 is on the ground with little or no speed and the local and remote engines 102*a*-102*b* are at idle or greater power (which is indicative that engine spool up is occurring during takeoff). At other times, asymmetric thrust mitigation is disabled, and the thrusts of the engines 102*a*-102*b* may be controlled normally. Based on the specific example of the mapping function 214 shown in FIG. 2, when asymmetric thrust mitigation is enabled, the logical architecture 200 can apply a modifier (the selected N2Dot acceleration multiplier value 216) to reduce the selected N2 acceleration schedule 224 for the leading engine if the N1 split value 212 indicates that an asymmetric thrust condition is developing. If there is little or no N1 split detected between the engines 102*a*-102*b*, the logical architecture 200 can have little or no effect on either engine’s N2 acceleration schedule. While this example shows that the modifier can only reduce the leading engine’s selected N2 acceleration schedule 224, the logical architecture 200 can be configured (via adjustment of the mapping function 214) to increase the lagging engine’s selected N2 acceleration schedule 224, such as when more authority is needed or desired. However implemented, the logical architecture 200 here may only affect each engine’s response if an N1 split exists and may auto-correct as the N1 split is reduced or eliminated.

Note that the logical architecture 200 is described above as being implemented for a pair of engines 102*a*-102*b*, where each thrust controller 138*a*-138*b* can implement the logical architecture 200 and where the local and remote engines are reversed for the thrust controllers 138*a*-138*b*. However, as noted above, the same techniques can be used with aircraft having more than two engines. For instance, in a four-engine aircraft, a pair of thrust controllers 138*a*-138*b* may be used for an inner pair of engines and used to substantially balance the thrusts of the inner pair of engines, and another pair of thrust controllers 138*a*-138*b* may be used for an outer pair of engines and used to substantially balance the thrusts of the outer pair of engines. This can be expanded to any number of engine pairs.

Also note that the logical architecture 200 can be implemented using any suitable hardware or any suitable combination of hardware and software/firmware. In some cases, for instance, the various functions of the logical architecture 200 can be implemented using software/firmware instructions that are executed or otherwise implemented using or more processing devices. In other cases, at least some of the functions of the logical architecture 200 can be implemented using hardware components.

Although FIG. 2 illustrates one example of a logical architecture 200 supporting mitigation of asymmetric thrust, various changes may be made to FIG. 2. For example, components can be added, omitted, combined, further subdivided, replicated, or placed in any other suitable configuration in FIG. 2 according to particular needs. Also, while FIG. 2 shows one specific set of conditions 240 and one specific technique for enabling and disabling asymmetric thrust mitigation, any other suitable set of conditions 240 and/or any other suitable technique may be used to enable and disable asymmetric thrust mitigation. In addition, while the logical architecture 200 here uses an N1 split to detect potential asymmetric thrust conditions, techniques using other cross-engine parameters may be supported by the logical architecture 200. For instance, the logical architecture 200 may use actual N2 speeds or actual measured thrusts to identify potential asymmetric thrust conditions.

Figure 3:
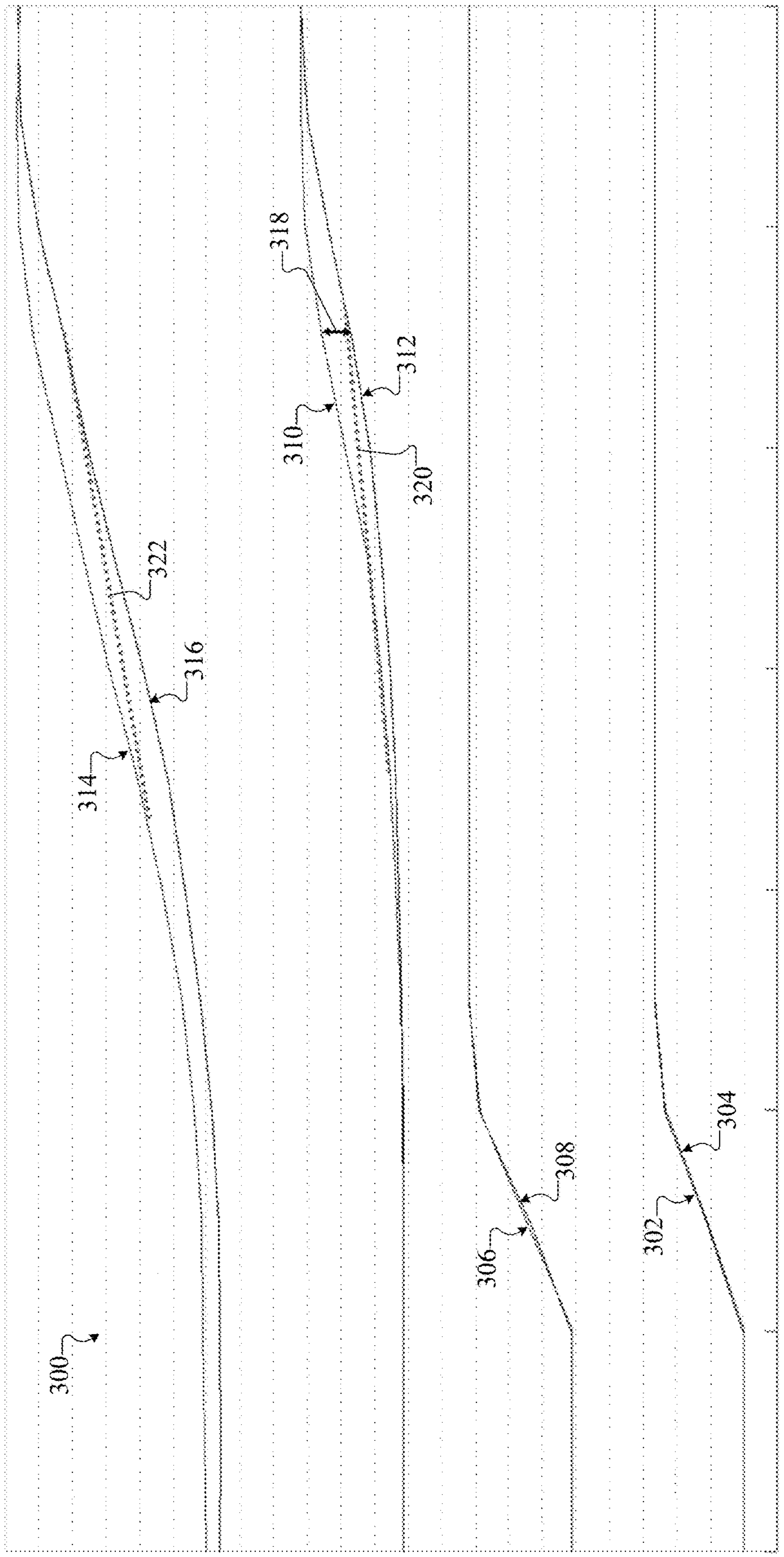
FIG. 3 illustrates an example chart showing results obtained using mitigation of asymmetric thrust according to this disclosure.

FIG. 3 illustrates an example chart 300 showing results obtained using mitigation of asymmetric thrust according to this disclosure. More specifically, the chart 300 shows example types of results that might be obtained using the logical architecture 200 of FIG. 2 in the thrust controllers 138*a*-138*b* in the aircraft 100 of FIG. 1.

As shown in FIG. 3, two lines 302 and 304 represent thrust lever angles for two engines 102*a*-102*b* of an aircraft 100. The lines 302 and 304 here are extremely similar and overlap, indicating that the thrust levers for the engines 102*a*-102*b* generally share common positions over time. Also, two lines 306 and 308 represent N1 reference speeds for the engines 102*a*-102*b* of the aircraft 100. Again, the lines 306 and 308 here are extremely similar and overlap, indicating that the N1 reference speeds of the engines 102*a*-102*b* are varying over time in substantially the same way. Both conditions are indicative of spooling up from idle or a low ground speed.

Lines 310 and 312 respectively represent N1 speeds for a local engine 102*a* and a remote engine 102*b*, and lines 314 and 316 respectively represent N2 speeds for the local engine 102*a* and the remote engine 102*b*. Even though the thrust lever angles and N1 reference speeds are very similar, the lines 310-312 diverge, leading to a relatively large N1 split 318 and causing asymmetric thrust. In the absence of any asymmetric thrust mitigation, this can cause various issues noted above.

Using the logical architecture 200 described above, the N1 speed of the local engine 102*a* represented by the line 310 can be modified, such as to follow the path 320 by modifying the local N2 speed 314 to follow the path 322. This brings the actual N1 speeds and the actual N2 speeds of the engines 102*a*-102*b* closer together, reducing or eliminating the asymmetric thrust and thereby providing asymmetric thrust mitigation.

Although FIG. 3 illustrates one example of a chart 300 showing results obtained using mitigation of asymmetric thrust, various changes may be made to FIG. 3. For example, the lines shown in FIG. 3 are examples only and are merely meant to illustrate how some embodiments of the logical architecture 200 might operate to mitigate asymmetric thrust. The specific results obtained can vary based on a number of factors, such as the specific conditions under which the logical architecture 200 is operating and the specific implementation of the logical architecture 200.

Figure 4:
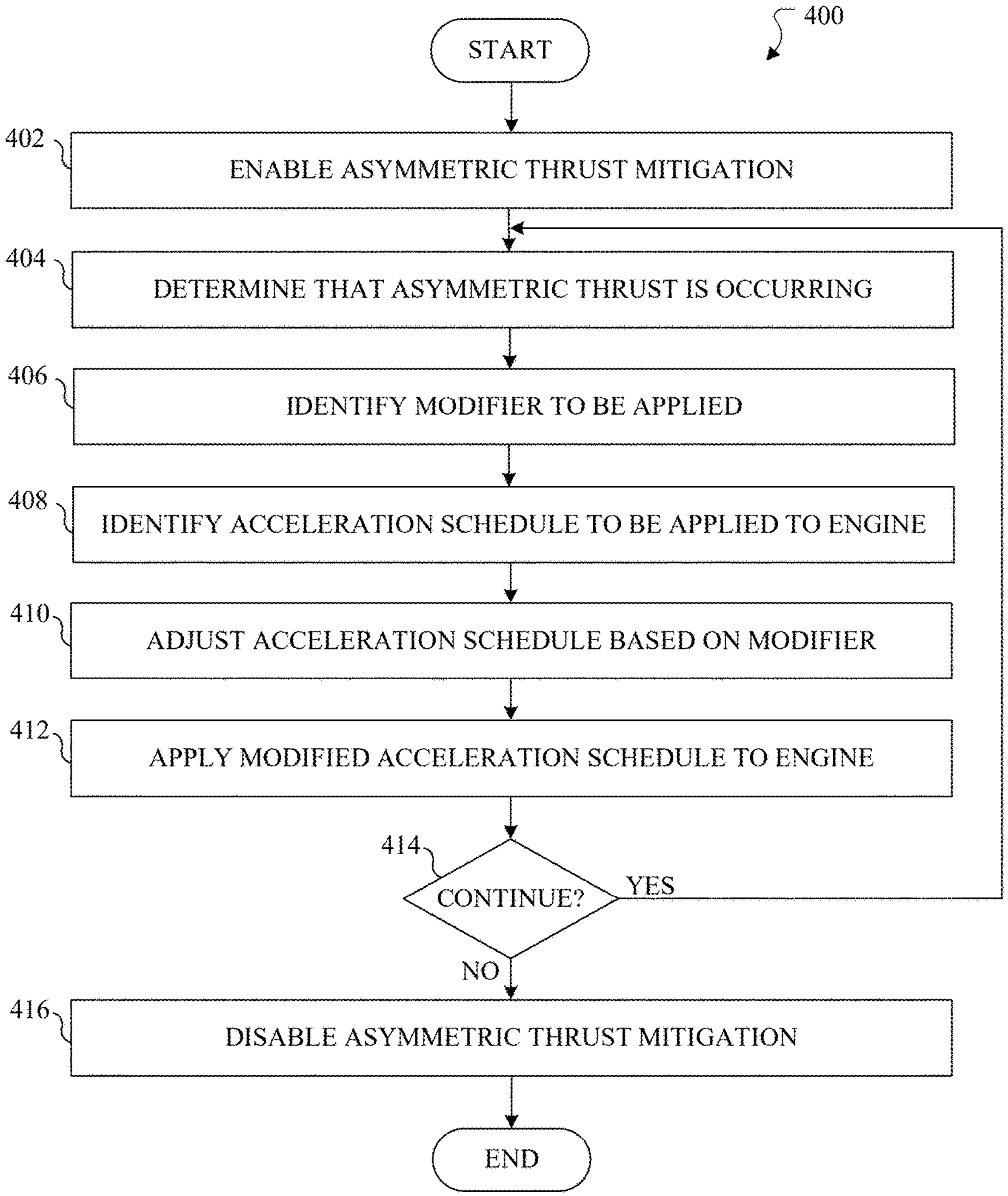
FIG. 4 illustrates an example method for mitigation of asymmetric thrust for aircraft according to this disclosure.

FIG. 4 illustrates an example method 400 for mitigation of asymmetric thrust for aircraft according to this disclosure. For ease of explanation, the method 400 is described as being performed in the aircraft 100 of FIG. 1, where each thrust controller 138*a*-138*b* includes the logical architecture 200 of FIG. 2. However, the method 400 may be performed using any suitable device(s) and in any suitable aircraft. Note that while the method 400 is described below specifically as being performed by the thrust controller 138*a*, the same process may be performed by the thrust controller 138*b* while reversing the local and remote engines.

As shown in FIG. 4, asymmetric thrust mitigation is enabled at step 402. This may include, for example, the thrust controller 138*a* determining that all of the various conditions 240 have been satisfied from the perspective of the local engine 102*a*. A determination is made that asymmetric thrust is occurring at step 404. This may include, for example, the thrust controller 138*a* of the engine 102*a* determining that an adequately-large N1 split exists between the local engine 102*a* and the remote engine 102*b*. As noted above, however, this may also be based on other data, such as N2 speeds or measured thrusts.

A modifier to be applied is identified at step 406, and an acceleration schedule to be applied to the engine is identified at step 408. This may include, for example, the thrust controller 138*a* using the mapping function 214 to convert an N1 split value 212 determined between the local engine 102*a* and the remote engine 102*b* into a corresponding N2Dot acceleration multiplier value 216. This may also include the thrust controller 138*a* using the mapping function 218 to convert the N2 speed of the local engine 102*a* into a corresponding N2Dot acceleration schedule 220. The acceleration schedule is adjusted based on the modifier at step 410, and the adjusted acceleration schedule is applied to the local engine at step 412. This may include, for example, the thrust controller 138*a* using the multiplier function 222 to multiply the N2Dot acceleration schedule 220 by the N2Dot acceleration multiplier value 216 in order to generate a selected N2 acceleration schedule 224. In some embodiments, if the local engine 102*a* is leading, this can result in reduction of the selected N2 acceleration schedule 224, while the lagging remote engine 102*b* can continue increasing its acceleration schedule. Otherwise, if the local engine 102*a* is lagging, this can result in the lagging local engine 102*a* continuing to increase its acceleration schedule 224, while the leading remote engine 102*b* may reduce its acceleration schedule. Of course, as noted above, other changes may be made to the engines 102*a*-102*b* depending on the mapping function 214.

A determination is made whether to continue performing asymmetric thrust mitigation at step 414. This may include, for example, the thrust controller 138*a* determining whether all of the various conditions 240 continue to be satisfied. If so, the process can return to an earlier step, such as step 404. Otherwise, asymmetric thrust mitigation can be disabled at step 416. This may include, for example, the thrust controller 138*a* causing the switch 242 to output a value of one to the multiplier function 222, which allows the selected N2 acceleration schedule 224 to be based on an unmodified version of the N2Dot acceleration schedule 220.

Although FIG. 4 illustrates one example of a method 400 for mitigation of asymmetric thrust for aircraft, various changes may be made to FIG. 4. For example, while shown as a series of steps, various steps in FIG. 4 may overlap, occur in parallel, occur in a different order, or occur any number of times (including zero times).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

detecting an asymmetric thrust condition involving first and second engines of an aircraft, the asymmetric thrust condition associated with one of the first and second engines providing more thrust than another of the first and second engines, wherein:

the first engine is associated with a first thrust controller;

the second engine is associated with a second thrust controller;

the first thrust controller is configured to modify an acceleration schedule of the first engine in response to detecting the asymmetric thrust condition; and the second thrust controller is configured to modify an acceleration schedule of the second engine in response to detecting the asymmetric thrust condition; and in response to detecting the asymmetric thrust condition:

determining a modifier for a specified one of the first and second engines, wherein the modifier is based on an N1 split value representing a difference between N1 speeds of the first and second engines; and applying the modifier to the acceleration schedule for the specified one of the first and second engines, the modifier altering the acceleration schedule for that engine to reduce asymmetric thrust between the first and second engines.

2. The method of claim 1, further comprising:

enabling an asymmetric thrust mitigation function of the aircraft in response to determining that one or more conditions associated with the aircraft are satisfied, the asymmetric thrust condition detected while the asymmetric thrust mitigation function is enabled; and disabling the asymmetric thrust mitigation function of the aircraft in response to determining that at least one of the one or more conditions associated with the aircraft is no longer satisfied, the asymmetric thrust condition not detected while the asymmetric thrust mitigation function is disabled.

3. The method of claim 2, wherein the one or more conditions associated with the aircraft indicate that the first and second engines of the aircraft are spooling up for takeoff from an idle condition or from a low ground speed condition.

4. The method of claim 2, wherein the one or more conditions associated with the aircraft comprise:

a weight of the aircraft at least partially resting on wheels of the aircraft;

a calibrated airspeed of the aircraft being below a first threshold;

a thrust lever angle of at least one engine throttle lever being at or above an idle position;

an N1 speed of at least one engine being below a second threshold; and a difference between N1 reference speeds of the first and second engines being below a third threshold.

5. The method of claim 1, wherein the asymmetric thrust condition is detected based on the difference between the N1 speeds of the first and second engines.

6. The method of claim 1, wherein at least one of:

the modifier decreases the acceleration schedule for the specified one of the first and second engines when an N1 speed of the specified one of the first and second engines leads an N1 speed of another of the first and second engines; and the modifier does not adjust the acceleration schedule or increases the acceleration schedule for the specified one of the first and second engines when the N1 speed of the specified one of the first and second engines lags the N1 speed of the other of the first and second engines.

7. An apparatus comprising:

at least one thrust controller configured to control at least one of first and second engines of an aircraft;

wherein each thrust controller is configured to:

detect an asymmetric thrust condition involving the first and second engines, the asymmetric thrust condition associated with one of the first and second engines providing more thrust than another of the first and second engines; and in response to detecting the asymmetric thrust condition:

determine a modifier for a specified one of the first and second engines, wherein the modifier is based on an N1 split value representing a difference between N1 speeds of the first and second engines; and apply the modifier to an acceleration schedule for the specified one of the first and second engines, the modifier altering the acceleration schedule for that engine to reduce asymmetric thrust between the first and second engines.

8. The apparatus of claim 7, wherein each thrust controller is further configured to:

enable an asymmetric thrust mitigation function of the thrust controller in response to determining that one or more conditions associated with the aircraft are satisfied, wherein the asymmetric thrust condition is detectable while the asymmetric thrust mitigation function is enabled; and disable the asymmetric thrust mitigation function of the thrust controller in response to determining that at least one of the one or more conditions associated with the aircraft is no longer satisfied, wherein the asymmetric thrust condition is not detectable while the asymmetric thrust mitigation function is disabled.

9. The apparatus of claim 8, wherein the one or more conditions associated with the aircraft indicate that the first and second engines of the aircraft are spooling up for takeoff from an idle condition or from a low ground speed condition.

10. The apparatus of claim 8, wherein the one or more conditions associated with the aircraft comprise:

a weight of the aircraft at least partially resting on wheels of the aircraft;

a calibrated airspeed of the aircraft being below a first threshold;

a thrust lever angle of at least one engine throttle lever being at or above an idle position;

an N1 speed of at least one engine being below a second threshold; and a difference between N1 reference speeds of the first and second engines being below a third threshold.

11. The apparatus of claim 7, wherein each thrust controller is configured to:

detect the asymmetric thrust condition based on the difference between the N1 speeds of the first and second engines.

12. The apparatus of claim 7, wherein at least one of:

the modifier decreases the acceleration schedule for the specified one of the first and second engines when an N1 speed of the specified one of the first and second engines leads an N1 speed of another of the first and second engines; and the modifier does not adjust the acceleration schedule or increases the acceleration schedule for the specified one of the first and second engines when the N1 speed of the specified one of the first and second engines lags the N1 speed of the other of the first and second engines.

13. The apparatus of claim 7, wherein:

the at least one thrust controller comprises a first thrust controller associated with the first engine and a second thrust controller associated with the second engine;

the first thrust controller is configured to modify an acceleration schedule of the first engine in response to detecting the asymmetric thrust condition; and the second thrust controller is configured to modify an acceleration schedule of the second engine in response to detecting the asymmetric thrust condition.

14. A non-transitory machine readable medium containing instructions that when executed cause a thrust controller to:

detect an asymmetric thrust condition involving first and second engines of an aircraft, the asymmetric thrust condition associated with one of the first and second engines providing more thrust than another of the first and second engines; and in response to detecting the asymmetric thrust condition:

determine a modifier for a specified one of the first and second engines, wherein the modifier is based on an N1 split value representing a difference between N1 speeds of the first and second engines; and apply the modifier to an acceleration schedule for the specified one of the first and second engines, the modifier altering the acceleration schedule for that engine to reduce asymmetric thrust between the first and second engines.

15. The non-transitory machine readable medium of claim 14, further containing instructions that when executed cause the thrust controller to:

enable an asymmetric thrust mitigation function of the thrust controller in response to determining that one or more conditions associated with the aircraft are satisfied, wherein the asymmetric thrust condition is detectable while the asymmetric thrust mitigation function is enabled; and disable the asymmetric thrust mitigation function of the thrust controller in response to determining that at least one of the one or more conditions associated with the aircraft is no longer satisfied, wherein the asymmetric thrust condition is not detectable while the asymmetric thrust mitigation function is disabled.

16. The non-transitory machine readable medium of claim 15, wherein the one or more conditions associated with the aircraft indicate that the first and second engines of the aircraft are spooling up for takeoff from an idle condition or from a low ground speed condition.

17. The non-transitory machine readable medium of claim 15, wherein the one or more conditions associated with the aircraft comprise:

a weight of the aircraft at least partially resting on wheels of the aircraft;

a calibrated airspeed of the aircraft being below a first threshold;

a thrust lever angle of at least one engine throttle lever being at or above an idle position;

an N1 speed of at least one engine being below a second threshold; and a difference between N1 reference speeds of the first and second engines being below a third threshold.

18. The non-transitory machine readable medium of claim 14, wherein the instructions that when executed cause the thrust controller to detect the asymmetric thrust condition comprise at least one of:

instructions that when executed cause the thrust controller to detect the asymmetric thrust condition based on the difference between the N1 speeds of the first and second engines.

19. The non-transitory machine readable medium of claim 14, wherein at least one of:

the modifier decreases the acceleration schedule for the specified one of the first and second engines when an N1 speed of the specified one of the first and second engines leads an N1 speed of another of the first and second engines; and the modifier does not adjust the acceleration schedule or increases the acceleration schedule for the specified one of the first and second engines when the N1 speed of the specified one of the first and second engines lags the N1 speed of the other of the first and second engines.

* * * * *